United States Patent

[11] 3,611,339

| [72] | Inventors | Lee M. Richey<br>328 Crestview Dr.;<br>Melvin N. Norris, R.D. #1, both of<br>Franklin, Pa. 16323 |
|---|---|---|
| [21] | Appl. No. | 758,092 |
| [22] | Filed | Sept. 6, 1968 |
| [45] | Patented | Oct. 5, 1971 |

[54] MINING MACHINE MOTOR CURRENT METER
3 Claims, 2 Drawing Figs.

[52] U.S. Cl. .................................................... 340/253 A,
324/122, 331/131
[51] Int. Cl. ....................................................... G08b 21/00
[50] Field of Search........................................... 340/248,
253; 324/122, 133; 331/129, 131, 64, 126, 130;
328/148, 210

[56] References Cited
UNITED STATES PATENTS

| 2,255,637 | 9/1941 | Wright | 340/248 |
| 3,221,318 | 11/1965 | Quirk | 340/253 X |
| 2,437,876 | 3/1948 | Cohn | 328/148 X |
| 2,654,860 | 10/1953 | Lewis | 318/490 |

FOREIGN PATENTS

| 313,208 | 6/1929 | Great Britain | 340/253 |

OTHER REFERENCES

Radio & Television News: " Novel Test Meter" by Weiss & Clark; Vol. 47, No. 4; Apr. 1952; page 42. copy in 324/122

*Primary Examiner*—John W. Caldwell
*Assistant Examiner*—Daniel Myer
*Attorney*—E. Wallace Breisch ABSTRACT: A method of preventing current overloading of electrical motors of a mining machine by means of a visible output signal which flashes at a rate proportional to the variation in current flow to such motors.

Inventors
Melvin N. Norris.
Lee M. Richey.

MINING MACHINE MOTOR CURRENT METER

As is known, many machines powered by electrical motors are energized to provide a peak current flow considerably in excess of the rated motor current to obtain a high-output torque so that the machine can be operated under peak load conditions for short periods of time. Inasmuch as the machine is energized under such peak load conditions the circuit-protecting devices for the electrical motors must necessarily permit such peak currents to be supplied to the machine. Unless additional controls are provided such circuit-protecting devices do not protect the electrical motors from being operated over prolonged periods of time at excess current and such operation can seriously damage the electrical motor or cause the motor to stall. As an example of such energization of electrical motors it is common practice to energize the motors of mining machines during what is known as the sump portion of the cutting cycle at currents up to 2½ times the motor's rated current. Thus the illustrated preferred embodiment is with reference to a mining machine in which a visual indication is provided to the operation to indicate when a predetermined excess current is supplied to a cutter motor of the mining machine which visual indication varies as the excess current varies.

Other advantages of this invention will be apparent from the following description and drawings of such preferred embodiment of this invention in which.

Figure 1:
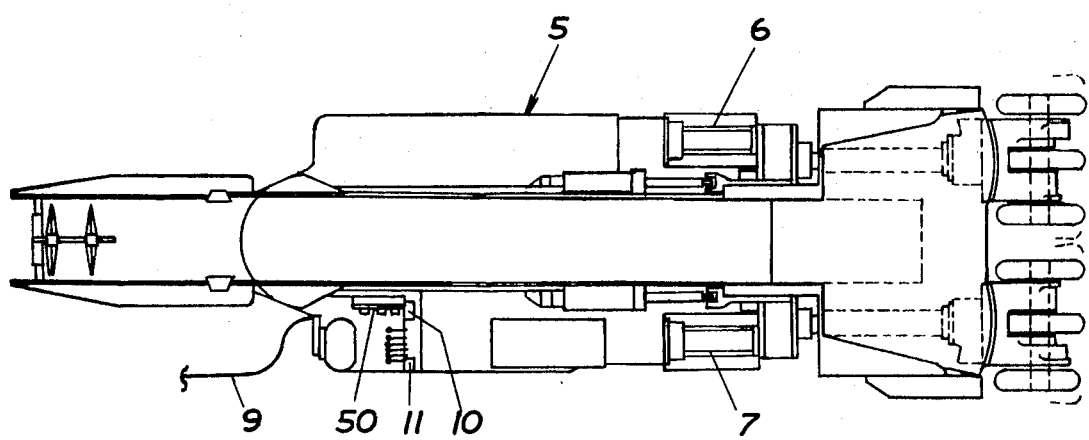
FIG. 1 is a plan view of a mining machine equipped with a visual indicator constructed in accordance with the principles of this invention.

FIG. 1 illustrates one type of well-known mining machine 5 which is fully described in U.S. Pat. No. 3,333,895 Machine 5 has a pair of movable and rotatable cutters which are driven by separate motors 6 and 7. Motors 6 and 7 are suitable energized from a suitable electrical control console 50 which is connected to a suitable power source by a trailing cable 9 as is well known. Visual indicators 10 and 11 of this invention are respectively electrically coupled to the electrical conductors which lead to the cutter motors 6 and 7.

The visual indicators 10 and 11 (FIG. 2) of the illustrative embodiment comprise neon glow lamps 35, which flash on and off within a predetermined range of current flow to cutter motors 6 and 7. As hereinafter described the frequency at which the lamp 35 flash is directly proportional to the current flow of motors 6.

Figure 2:
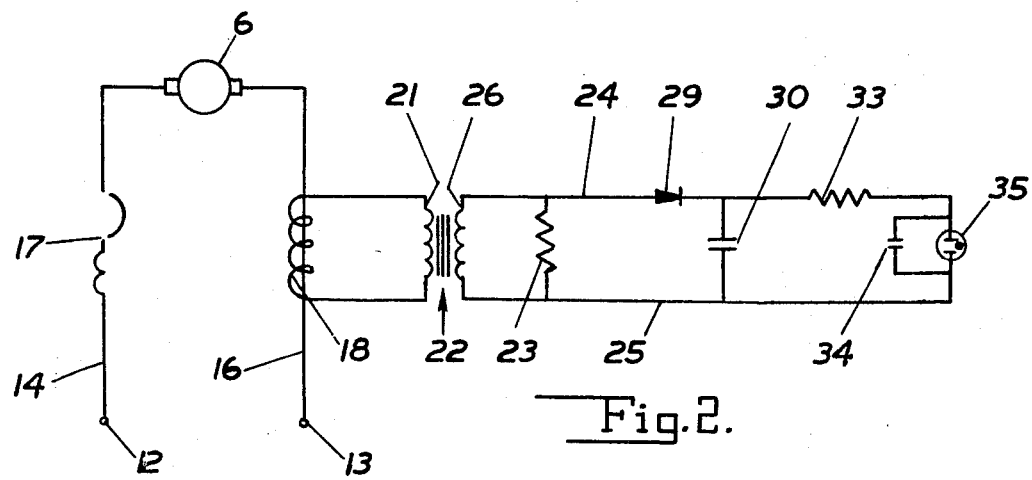
FIG. 2 is a schematic electrical diagram of the visual indicator means of this invention.

As schematically shown in FIG. 2 spaced electrical conductors 14 and 16 are adapted to be connected to a suitable source of alternating current at spaced electrical current input terminals 12 and 13 are suitably electrically connected to the cutter motor 6. Suitable circuit protecting means such as a current responsive circuit breaker 17, is electrically connected to conductor 14 to insure current overload protection to motor 6; however, the sensitivity if the breaker 17 is selected such that the peak currents as hereinafter described can be passed without causing the breaker to trip.

A signal generating circuit is suitably electrically coupled to the motor 6 circuit to provide a signal directly proportional to the current in the motor circuit which as shown comprises a current transformer 18 coupled to the input conductor 16 with the output thereof energizing a primary winding 21 of a step up transformer 22. Transformer 22 has a secondary winding 26 the ends of which are connected by suitable conductors 24 and 25 to the electrodes of lamp 35. A resistor 23 is electrically connected across electrical conductors 24 and 25, in parallel with the secondary winding 26, to provide a load for the output of the transformer 22 and to establish the input voltage to a relaxation oscillator in which the frequency of oscillation is determined by the time constant of a resistance capacitance network.

In order to provide a direct current supply to the relaxation oscillator the output current of transformer 22 is rectified by a diode 29 connected in series in conductor 24 on the load side of resistor 23. A filter capacitor 30, is electrically connected across conductors 24 and 25 on the output side of diode 29 to smooth the power input to the relaxation oscillator.

A resistor 33 is connected in conductor 24 in series with the lamp 35 and a capacitor 34 is connected in parallel with the lamp 35 and these components, i.e., resistor 33, capacitor 34 and lamp 35 constitute a well-known neon glow lamp relaxation oscillator. In such an oscillator current flow through the resistor 33 charges the capacitor 34 to the breakdown voltage of the lamp 35 at which time the lamp 35 will become conductive. After such conduction has been initiated the glow lamp 35 abruptly switches from a high resistance to a low resistance, and rapidly discharges the capacitor 34 through the lamp 35. Lamp 35 will remain conductive until the voltage across the lamp 35 drops below the extinguishing voltage thereof at which time the lamp 35 is extinguished and is again a high-resistance element. Upon successive half wave inputs the capacitor 34 again becomes charged, repeating the above described cycle, and thus produces a repeated flashes of lamp 35 which continue as long as the power supply is maintained. To allow the use of a relaxation oscillator having a high sensitivity most of the output energy from transformer 22 is dissipated as heat across the load resistor 23.

Since all the components of the indicator circuit are constant, the oscillations, or frequency of flashes, of lamp 35 can be varied in relation to the variations in the input current to the cutter motor 6. Thus, as current input to cutter motor 6 increases, the output signal of the current transformer 18 increases, thereby providing an increased current flow in the indicator circuit to charge capacitor 34 at a faster rate. It will be appreciated that as the rate of charging of capacitor 34 increases the frequency at which the lamp flashes will be increased. Conversely, as the input current to cutter motor 6 decreases, the frequency of flashing lamp 35 decreases.

In order to achieve the purposes of this invention with relation to the particular requirements of a cutter motor 6 the components of the circuit are selected so that the flashing of lamp 35 initially occurs when the input current is approximately twice the rated current of cutter motor 6 and the lamp 35 flashes at the maximum desired rate when the input current is approximately two and one half times (2½) the rated current.

Typical parameters for a practical system which contains a 115 HP, 440 volt AC cutter motor 6 with a rated current of 150 amps, to achieve a flash rate of lamp 35 which varies from 1 time/sec. at 300 amps to 20 times/sec. at 450 amps (approximately the frequency at which the flashing lamp would appear to be emitting a steady light) which have been found to be satisfactory are: load resistor 23, 10,000 ohms; resistor 33, 10,000 ohms; 500 V/PIV 0.5 amps diode 29; capacitor 30, 0.1 microfarads; capacitor 34, 0.33 microfarads and a A057B neon glow lamp 35. In actual practice resistor 33 comprises two resistors in series one of which is of a given resistive value such as 10,000 ohms and the other of which is selectable to provide for adjustment of the total resistive value as required due to the varying electrical characteristics of neon glow lamps such as lamp 35.

Although an embodiment of this invention has been described with a use direct toward the indicating of current flow to a cutter motor during a mining machine sumping operation it is to be noted that the invention can be used in any circuit which has a varying input current although the most practical application is with machines of a type which are used in a dark environment to enable the flashing of the glow lamp to be clearly visible.

What is claimed is:

1. A method of indicating current flow to prevent overloading of rated current electrical motors of an underground mining machine comprising the steps of: energizing at least one motor of a mining machine which is operable at a rated current through an electrically energizable input circuit; deriving a signal proportional to the current flow in said input circuit; and energizing by said derived signal at least one device having a visible output signal which flashes at a rate proportional to said current flow is at least equal to said rated current and is not greater than substantially twice said rated current and is a steady visible signal when said current flow is at least twice said rated current.

2. A method as specified in claim 1 wherein said steady visible signal occurs when said current flow is approximately 2½ times said rated current.

3. A method as specified in claim 1 wherein said first-mentioned energizing is from an alternating current source and said deriving is of an alternating current signal, and additionally rectifying said signal prior to energizing said device.